United States Patent
Barraza Enciso et al.

(10) Patent No.: US 11,436,517 B2
(45) Date of Patent: Sep. 6, 2022

(54) QUANTUM-TUNNELING-ENABLED DEVICE CASE

(71) Applicant: Bank of America Corporation, Charlotte, NC (US)

(72) Inventors: Maria Carolina Barraza Enciso, New York, NY (US); Elena Kvochko, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 552 days.

(21) Appl. No.: 16/550,531

(22) Filed: Aug. 26, 2019

(65) Prior Publication Data

US 2021/0065035 A1 Mar. 4, 2021

(51) Int. Cl.
*G06N 10/00* (2022.01)
*G06F 21/44* (2013.01)
*G06F 21/56* (2013.01)
*G06F 7/58* (2006.01)
*G06F 21/86* (2013.01)
*H04L 9/00* (2022.01)

(52) U.S. Cl.
CPC .............. *G06N 10/00* (2019.01); *G06F 7/588* (2013.01); *G06F 21/44* (2013.01); *G06F 21/566* (2013.01); *G06F 21/86* (2013.01); *H04L 9/00* (2013.01)

(58) Field of Classification Search
CPC ......... G06N 10/00; G06F 7/588; G06F 21/44; G06F 21/566; G06F 21/86; H04L 9/00
USPC ........................................................ 380/255
See application file for complete search history.

(56) References Cited

U.S. PATENT DOCUMENTS

| | | |
|---|---|---|
| 7,178,277 B2 | 2/2007 | Takeuchi |
| 7,519,641 B2 | 4/2009 | Ribordy et al. |
| 7,577,257 B2 | 8/2009 | Xia et al. |
| 7,590,868 B2 | 9/2009 | Musa et al. |
| 7,697,693 B1 | 4/2010 | Elliott |
| 7,706,535 B1 | 4/2010 | Pearson et al. |
| 7,929,700 B2 | 4/2011 | Lodewyck et al. |
| 8,340,298 B2 | 12/2012 | Gelfond et al. |
| 8,483,394 B2 | 7/2013 | Nordholt et al. |
| 8,582,769 B2 | 11/2013 | Zhao et al. |
| 8,639,932 B2 | 1/2014 | Wiseman et al. |

(Continued)

OTHER PUBLICATIONS

Quintessence et al; Quantum Tunneling Away From Cyber Criminals; Feb. 2018; Quintessence Labs. (Year: 2018).

(Continued)

*Primary Examiner* — Tomi Skibinski
(74) *Attorney, Agent, or Firm* — Weiss & Arons LLP (57) ABSTRACT

Apparatus and methods are provided for a quantum-tunneling enabled case, or cases, for making a plurality of silicon-based electronic devices quantum-resilient. The case may include a plurality of silicon-based electronic devices. The case may also include a quantum random number generator that generates encryption keys. The keys may be for use in encrypting transmission transmitted from the electronic devices. The communications transmitted from the plurality of silicon-based electronic devices may be routed to the case prior to being transmitted to their intended recipient. The case may encrypt the communications received at the case using random numbers generated by the quantum random number generator. The case may transmit the encrypted communications to their intended recipients.

11 Claims, 9 Drawing Sheets

(56) References Cited

U.S. PATENT DOCUMENTS

| | | | |
|---|---|---|---|
| 8,650,401 | B2 | 2/2014 | Wiseman et al. |
| 8,693,691 | B2 | 4/2014 | Jacobs |
| 8,744,075 | B2 | 6/2014 | Tanaka |
| 8,897,449 | B1* | 11/2014 | Broadbent ............ H04L 9/0891 |
| | | | 380/278 |
| 8,903,094 | B2 | 12/2014 | Bovino |
| 9,663,358 | B1 | 5/2017 | Cory et al. |
| 10,127,499 | B1* | 11/2018 | Rigetti .................. G06N 10/00 |
| 10,296,047 | B2 | 5/2019 | Kailman et al. |
| 10,348,493 | B2 | 7/2019 | Fu et al. |
| 10,644,882 | B2* | 5/2020 | Kurian ...................... H04L 9/12 |
| 10,708,046 | B1 | 7/2020 | Ashrafi |
| 10,802,800 | B1* | 10/2020 | Vakili ..................... G06F 7/588 |
| 11,120,357 | B2 | 9/2021 | Zeng et al. |
| 2010/0223385 | A1 | 9/2010 | Gulley et al. |
| 2011/0182428 | A1 | 7/2011 | Zhao et al. |
| 2011/0317836 | A1 | 12/2011 | Yeh et al. |
| 2013/0315395 | A1 | 11/2013 | Jacobs |
| 2014/0068765 | A1 | 3/2014 | Choi et al. |
| 2014/0355998 | A1 | 12/2014 | Tanzilli et al. |
| 2015/0199178 | A1 | 7/2015 | Shi et al. |
| 2016/0226840 | A1 | 8/2016 | Buccella et al. |
| 2017/0038793 | A1 | 2/2017 | Kallman et al. |
| 2017/0063827 | A1 | 3/2017 | Ricardo |
| 2018/0089733 | A1 | 3/2018 | Huang et al. |
| 2018/0240032 | A1 | 8/2018 | Van Rooyen |
| 2018/0309785 | A1 | 10/2018 | Kurian |
| 2018/0365585 | A1 | 12/2018 | Smith et al. |
| 2019/0026234 | A1 | 1/2019 | Harnik et al. |
| 2019/0097792 | A1* | 3/2019 | Howe ........................ H04L 9/14 |
| 2019/0322298 | A1 | 10/2019 | Mong et al. |
| 2020/0043007 | A1 | 2/2020 | Simons |
| 2020/0274697 | A1 | 8/2020 | Ragan |
| 2020/0304292 | A1 | 9/2020 | Mochalov |
| 2020/0351089 | A1 | 11/2020 | Wentz |
| 2020/0387395 | A1 | 12/2020 | Viale et al. |
| 2021/0044433 | A1 | 2/2021 | Hay et al. |
| 2021/0081935 | A1 | 3/2021 | Faulkner et al. |
| 2021/0314143 | A1 | 10/2021 | Conner |

OTHER PUBLICATIONS

Jason M. Rubin, "Can a Computer Generate a Truly Random Number?" https://engineering.mit.edu/engage/ask-an-engineer/can-a-computer-generate-a-truly-random-number/, Nov. 1, 2011.

John Kelsey et al., "Cryptanalytic Attacks on Pseudorandom Number Generators," https://www.schneier.com/academic/paperfiles/paper-prngs.pdf, University of California Berkeley, 1998.

Tom Foremski, IBM Warns of Instant Breaking of Encryption by Quantum Computers: 'Move Your Data Today', https://www.zdnet.com/article/ibm-warns-of-instant-breaking-of-encryption-by-quantum-computers-move-your-data-today/, CBS Interactive, May 18, 2018.

John Cox, "New iOS App Secures IM Traffic with 'Post Quantum' Encryption Scheme: PQChat Intended as Secure Alternative to WhatsApp," https://www.networkworld.com/article/2177124/new-ios-app-secures-im-traffic-with--post-quantum--encryption-scheme.html, Network World, May 23, 2014.

Jack Purcher, "Apple Patent Reveals Breakthrough Quantum Tunneling Touch-Sensitive Materials for iPhone, Smart Cases & More," https://www.patentlyapple.com/patently-apple/2017/02/apple-patent-reveals-breakthrough-quantum-tunneling-touch-sensitive-materials-for-iphone-smart-cases-more.html, Feb. 9, 2017.

Robert Samuel Hanson, "Quantum Computers will Break the Encryption that Protects the Internet," https://www.economist.com/science-and-technology/2018/10/20/quantum-computers-will-break-the-encryption-that-protects-the-internet, The Economist, Oct. 20, 2018.

Cathal O'Connell, "Quantum Computing for the Qubit Curious," https://cosmosmagazine.com/physics/quantum-computing-for-the-qubit-curious, Cosmos, Aug. 8, 2016.

"Quantum Computing," https://en.wikipedia.org/wiki/Quantum_computing, Wikimedia Foundation, Inc., Jul. 14, 2019.

Lily Chen et al., "Report on Post-Quantum Cryptography," https://nvlpubs.nist.gov/nistpubs/ir/2016/NIST.IR.8105.pdf, National Institute of Standards and Technology, Apr. 2016.

"Security Token," https://en.wikipedia.org/wiki/Security_token, Wikimedia Foundation, Inc., Jun. 21, 2019.

Gorjan Alagic et al., "Status Report on the First Round of the NIST Post-Quantum Cryptography Standardization Process," https://www.nist.gov/publications/status-report-first-round-nist-post-quantum-cryptography-standardization-process, National Institute of Standards and Technology, Jan. 2019.

Christian S. Calude and Elena Calude, "The Road to Computational Supremacy," https://arxiv.org/pdf/1712.01356.pdf, Jan. 10, 2019.

Patrick Nohe, "What is an Air Gapped Computer?" https://www.thesslstore.com/blog/air-gapped-computer/, HashedOut, Mar. 13, 2018.

Emily Grumbling and Mark Horowitz, "Quantum Computing: Progress and Prospects," https://www.nap.edu/read/25196/chapter/1, National Academy of Sciences, 2018.

"An Introduction to High Availability Architecture," https://www.getfilecloud.com/blog/an-introduction-to-high-availability-architecture/, CodeLathe Technologies Inc., Retrieved on Sep. 26, 2019.

* cited by examiner

| Crypto-system | Category | Key Size | Security Parameter | Quantum Algorithm Expected to Defeat Cryptosystem | # Logical Qubits Required | # Physical Qubits Required | Time Required to Break System | Quantum-Resilient Replacement Strategies |
|---|---|---|---|---|---|---|---|---|
| AES-GCM | Symmetric encryption | 128<br>192<br>256 | 128<br>192<br>256 | Grover's algorithm | 2,953<br>4,449<br>6,681 | $4.61 \times 10^6$<br>$1.68 \times 10^7$<br>$3.36 \times 10^7$ | $2.61 \times 10^{12}$ years<br>$1.97 \times 10^{22}$ years<br>$2.29 \times 10^{32}$ years | |
| RSA | Asymmetric encryption | 1024<br>2048<br>4096 | 80<br>112<br>128 | Shor's algorithm | 2,050<br>4,098<br>8,194 | $8.05 \times 10^6$<br>$8.56 \times 10^6$<br>$1.12 \times 10^7$ | 3.58 hours<br>28.63 hours<br>229 hours | Move to NIST-selected PQC algorithm when available |
| ECC Discrete-log problem | Asymmetric encryption | 256<br>384<br>521 | 128<br>192<br>256 | Shor's algorithm | 2,330<br>3,484<br>4,719 | $8.56 \times 10^6$<br>$9.05 \times 10^6$<br>$1.13 \times 10^6$ | 10.5 hours<br>37.67 hours<br>55 hours | Move to NIST-selected PQC algorithm when available |
| SHA256 | Bitcoin mining | N/A | 72 | Grover's algorithm | 2,403 | $2.23 \times 10^6$ | $1.8 \times 10^4$ years | |
| PBKDF2 with 10,000 iterations | Password hashing | N/A | 66 | Grover's algorithm | 2,403 | $2.23 \times 10^6$ | $2.3 \times 10^7$ years | Move away from password-based authentication |

TUNNEL EFFECT

When a quantum object is sent on a thick barrier, it bounces off.

If the barrier is thin enough, the object may sometimes get through.

If the barrier is thin enough, the object may sometimes get through. The thinner the barrier, the more likely the object to pass.

QUANTUM-TUNNELING-ENABLED DEVICE CASE

FIELD OF TECHNOLOGY

Aspects of the disclosure relate to quantum computing. Specifically, this disclosure relates to harnessing the power of quantum computing to harden the security of communications being transmitted to and from silicon-based devices.

BACKGROUND

Quantum computing is the use of quantum-mechanical phenomena such as superposition and entanglement to perform computations. The smallest bit in a quantum computer is called a qubit. Quantum computing differs from classical computing in such a way that each qubit can be in a zero state and a one state at the same time.

The amount of data that a quantum computer is able to hold and manipulate grows exponentially with the number of qubits included in the quantum computer. A quantum computer with n qubits is able to simultaneously represents $2^n$ states. Therefore, two qubits can hold four states, three qubits can hold eight states and fifty qubits can hold 1, 125, 899, 906, 842, 624 states.

Quantum-tunneling effect is a property of quantum physics. Quantum-tunneling enables a particle to pass through a physical barrier even if it does not have enough energy to go over the barrier. The passing through effect, or the tunneling effect, enables particles to possibly penetrate the physical barrier. A particle is more or less probable to pass through the physical barrier based on one or more criteria. The criteria include the size of the particle and the thickness of the physical barrier. A smaller particle is more probable to pass through a physical barrier, and a thinner barrier is a more likely conduit for the passing through of a particle.

Quantum random number generation is a method of using quantum physics to generate true random numbers. Random number generation is a method or system for generating a sequence of numbers or symbols that cannot be reasonably predicted better than by chance. Because classical computers are mostly deterministic—i.e., can be determined with a high probability, it is difficult to generate random numbers using classical computers. Typical random number generators used by classical computers are pseudo-random number generators, which means that an algorithm is used to generate the pseudo-random numbers by collecting randomness from various low-entropy input streams. These pseudo-random numbers are hard to be predicted by a human. However, these pseudo-random numbers may be predicted by a large effort from multiple classical computers. The identification of the pseudo-random numbers is of great importance because random numbers are, in many applications, used to generate the keys to cryptography systems. The ability to predict a pseudo-random number undermines the security of the systems secured by the pseudo-random number. Therefore, quantum random number generation, that generates true random numbers, are unable to be identified using quantum computers, which is essential for securing a post quantum computing era.

While quantum computers, if they become prolific and commercially available, may redefine cryptographic systems; quantum computers will most likely not replace silicon computers, nor will they perform the same tasks that are currently implemented by silicon computers.

It would be advantageous to create a hybrid quantum-silicon device that combines the benefits of quantum computing, quantum-tunneling and quantum random number generation and the benefits of silicon-based devices.

SUMMARY OF THE DISCLOSURE

A quantum-tunneling-enabled device case is provided. The quantum-tunneling-enabled device case may provide quantum-resilient properties to a silicon-based electronic device. The case may include a housing for the silicon-based electronic device. The housing may include quantum-tunneling material. The case may also include a quantum random number generator. The quantum random number generator may generate encryption keys. The encryption keys may be used to encrypt communications transmitted from the electronic device.

The silicon-based electronic device may transmit a message to second device. The silicon-based electronic device may transmit the message via quantum-tunneling. The case may intercept the transmitted message. The case may intercept the transmitted message via quantum-tunneling. The case may generate a true random number. The case may encrypt the intercepted message using the true random number. The case may transmit the encrypted message to the intended recipient. The case may transmit the message to the intended recipient via quantum tunneling. The case may intercept the message via quantum-tunneling technology.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Apparatus and methods for quantum-resilient communication between a first silicon-based device and second silicon-based device is provided. The method may include encapsulating the first device in a first quantum-tunneling-enabled device case. The method may include encapsulating the second device in a second quantum-tunneling-enabled device case.

The method may include transmitting a communication from the first device. The communication may include configuration properties. The configuration properties may include a sender, a receiver, a message size and any other suitable properties. The configuration properties may conform to predetermined message standard, such as the transmission control protocol/internet protocol ("TCP/IP").

The method may include receiving the communication at the first quantum-tunneling-enabled device case. The communication may be received via a first quantum-tunneling wave. Quantum-tunneling may be the quantum property in which a charge or wave, such as the flow of electrons, passes through a material that it could usually not pass through. Electrical charge does not usually travel well through an insulating material such as silicon. However, using quantum-tunneling technology, a flow of electrons may be pushed through an insulating material. Communications transmitted from a device may be considered a flow of electrons. Therefore, the quantum-tunneling-enabled device case may serve two or more purposes. Firstly, the case may prevent any communications, transmitted from the device and intercepted at the case, from passing beyond the case. Secondly, the case may be able to push communications outside the case, to another device and/or the public internet, upon a command initiated by the case.

The first quantum-tunneling-enabled device case may also include a quantum random number generator. The quantum random number generator may be a random number generator that uses quantum technology to generate true random numbers as opposed to pseudo-random numbers. The first quantum-tunneling-enabled device case may generate a quantum-resilient random number.

The first quantum-tunneling-enabled device case may then use the generated quantum-resilient random number to encrypt the intercepted communication. The first quantum-tunneling-enabled device case may push the encrypted communication, or transmit the encrypted communication, to a location outside of the case. The location may be the public internet, a network, another device or any other suitable location. In some embodiments, the encrypted communication may pass through multiple locations until arriving at a final destination. As such, the encrypted communication may be transmitted over a network to the second device.

The method may also include receiving the encrypted communication at the second quantum-tunneling-enabled device case. The method may include decrypting the encrypted communication at the second quantum-tunneling-enabled device case. The method may also include transmitting the communication from the second quantum-tunneling-enabled device case to the second device. The transmission may be via a second quantum-tunneling wave. It should be appreciated that each step of the communication transmission—i.e., between the first device and the first case, between the first case and the second case and between the second case and the second device—may utilize quantum-tunneling technology to transmit the communication. In some embodiments, one or more of the communication transmission steps may utilize quantum-tunneling technology.

In some embodiments, the first device may be an automated teller machine ("ATM"). The ATM may communicate with the second device, which may be a smartphone. The communication between the ATM and the smartphone may be an authentication communication. At times, the ATM may initiate the communication with the smartphone, and therefore the ATM may be considered the first device. Other times, the smartphone may initiate the communication with the ATM, and therefore the smartphone may be considered the first device.

A quantum-tunneling-enabled farm may also be provided. The farm may make the plurality of cases around silicon-based electronic devices. The farm may include a quantum random number generator. The quantum random number generator may generate encryption keys. The generated encryption keys may be true random numbers, as described above.

The farm may be a group of quantum devices. The farm may exist within a network. The farm may harness the power of the multiple quantum devices. The farm may serve as a quantum-resilient case for multiple legacy devices. The farm may generate a true random number encryption key for each received communication. The farm may then encrypt each received communication with the generated encryption key. The encryption may be performed prior to transmitting the communication to the intended recipient. All communications transmitted from the plurality of silicon-based electronic devices may be routed to the farm prior to being transmitted to their intended recipient. In this way, the communications, which may be non-quantum-resilient, may be initially transmitted to the quantum-tunneling-enabled farm, in order to be encrypted and made quantum-resilient. The farm may then transmit the now quantum-resilient communications to their intended recipient. The transmission to and from the farm may utilize quantum-tunneling technology.

The farm may also intercept, or receive, all communications going to each of the silicon-based electronic devices prior to the communications being transmitted to the devices. Upon interception, or receipt, of a communication, the farm may decrypt the communication, if necessary, and/or forward the communication to the intended receiving device.

An illustrative example of a quantum-tunneling-enabled farm may be a rack within a server room in an office building. The server rack may serve as a case for multiple devices which are meant to send information externally. The farm may also encrypt each intercepted communication prior to enabling the communication to be transmitted to its intended recipient. The farm may also push, or transmit, each communication outside of the server rack to enable the communication to be transmitted to its intended recipient.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
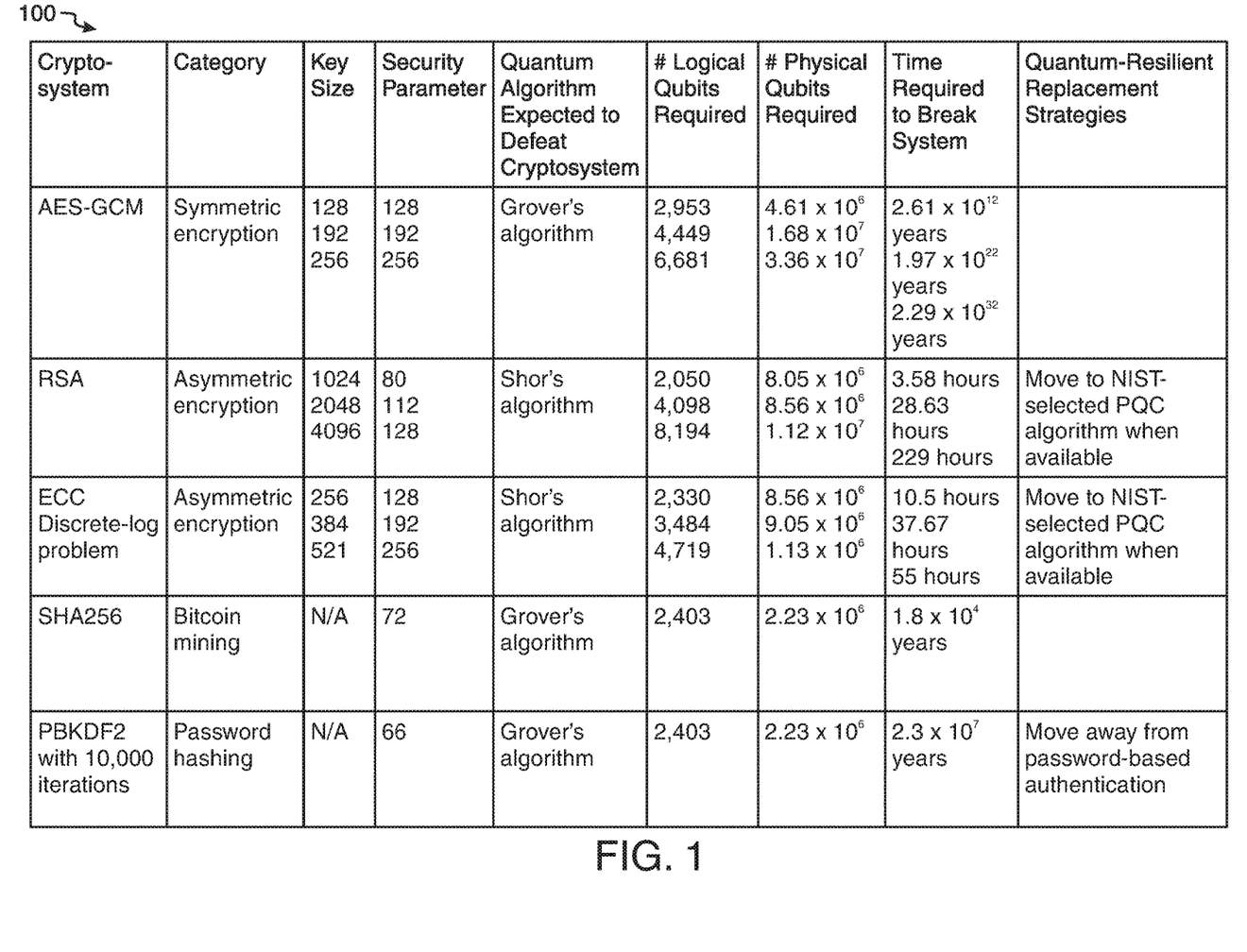
FIG. 1 shows an illustrative table in accordance with principles of the disclosure.

FIG. 1 shows an illustrative table, available from Grumbling, Emily, and Mark Horowitz. QUANTUM COMPUTING: Progress and Prospects, 2019. Chapter 4, page 98. NATIONAL ACADEMIES PRESS, 2019, which is hereby incorporated by reference herein in its entirety.

The illustrative table shows the impact of quantum computing on common cryptographic algorithms. Quantum computing may target two components of crypto systems. The first component may be the algorithms. The second component may be the random number generators.

Crypto systems rely on encryption algorithms. There may be two different kinds of encryption. The first kind of encryption may be symmetric encryption. The second kind of encryption may be asymmetric encryption. In symmetric encryption, two communicating parties may hold the same or similar keys. In asymmetric encryption, two communicating parties may hold different keys, such as a public/private key pair. The keys are used to encrypt and decrypt messages that are communicated between the two parties.

Random number generation, as described above, may be the generation of random numbers. Random number generation may be used to encrypt keys and hashes. Random number generation performed on legacy devices may be pseudo-random number generation. Quantum devices may be able to more easily identify pseudo-random numbers, or a pattern associated with the pseudo-random number generation.

It should be appreciated that if either the algorithms or the systems that rely on random number generation are weak, it may create a single point of failure. In order for a cryptographic system to be strong, all of the points of entry should be well secured.

Therefore, the quantum-tunneling-enabled device case may provide both a secure exchange of information over a network using a secure hardware and strong random number generation.

Table 100, shown in FIG. 1, describes various cryptosystems and the proposed impact that quantum computing will have on these cryptographic algorithms. The current cryptosystems include Advanced Encryption System Galois/Counter Mode ("AES-GCM"), Rivest, Shamir and Adelman ("RSA"), Elliptic-Curve Cryptography Discrete-log problem ("ECC Discrete-log problem"), secure hash algorithm 256 bit ("SHA256") and Password-based key derivation function 2 with 10,000 iterations ("PBKDF2 with 10,000 iterations").

AES-GCM may be in the category of symmetric encryption. AES-GCM may be implemented using various key sizes. The key sizes may include 128-bit, 192-bit and 256-bit. The security parameter associated with the 128-bit key size may be 128. The security parameter associated with 192-bit may be 192. The security parameter associated with 256-bit may be 256.

The algorithm that can be implemented on a quantum computer that may defeat AES-GCM cryptosystems may be Grover's algorithm. The number of logical qubits that may be required to implement Grover's algorithm on the AES-GCM cryptosystem may be 2,953 for the 128-bit key size, 4,449 for the 192-bit key size and 6,681 for the 256-bit key size. The number of physical qubits that may be required to implement Grover's algorithm on the AES-GCM cryptosystem may be $4.61 \times 10^6$ for the 128-bit key size, $1.68 \times 10^7$ for the 192-bit size and $3.36 \times 10^7$ for the 256-bit key size.

The time required to break the AES-GCM encryption algorithm may be $2.61 \times 10^{12}$ years for the 128-bit key size, $1.97 \times 10^{22}$ years for the 192-bit key size and $2.29 \times 10^{32}$ years for the 256-bit key size.

RSA may be in the category of asymmetric encryption. RSA may be implemented using various key sizes. The keys sizes may include 1024-bit, 2048-bit, 2096-bit. The security parameter associated with the 1024-bit key size may be 80. The security parameter associated with the 2048-bit key size may be 112. The security parameter associated with the 2096-bit key size may be 128.

The algorithm that can be implemented on a quantum computer that may defeat RSA cryptosystems may be Shor's algorithm. The number of logical qubits that may be required to implement Shor's algorithm on the RSA cryptosystem may be 2,050 for the 1024-bit key size, 4,098 for the 2048-bit key size and 8,194 for the 4096-bit key size. The number of physical qubits that may be required to implement Shor's algorithm on the RSA cryptosystem may be $8.05 \times 10^6$ qubits for the 1024-bit key size, $8.56 \times 10^6$ for the 2048-bit key size and $1.12 \times 10^7$ for the 4096-bit key size.

The time required to break the RSA cryptosystem using Shor's algorithm may be 3.58 hours for the 1024-bit key size, 28.63 hours for the 2048-bit key size and 229 hours for the 4096-bit key size. The quantum-resilient replacement strategy for the RSA cryptosystem may be to move to the National Institute of Standards and Technology ("NIST") selected post-quantum cryptography ("PQC") algorithm when it is available.

ECC discrete-log problem may be in the category of asymmetric encryption. ECC discrete-log problem may be implemented using various key sizes. The key sizes may include 256-bit, 384-bit and 521-bit key sizes. The security parameter associated with the 256-bit key size may be 128. The security parameter associated with the 384-bit key size may be 192. The security parameter associated with the 521-bit key size may be 256.

The algorithm that can be implemented on a quantum computer that may defeat the ECC Discrete-log problem may be Shor's algorithm. The number of logical qubits that may be required to implement Shor's algorithm on the ECC discrete-log problem may be 2,330 for the 256-bit key size, 3,484 for the 384-bit key size and 4,719 for the 521-bit key size. The number of physical qubits that may be required to implement Shor's algorithm on the ECC discrete-log problem may be $8.56 \times 10^6$ for the 256-bit key size, $9.05 \times 10^6$ for the 384-bit key size and $1.13 \times 10^6$ for the 521-bit key size.

The time required to break the ECC discrete-log problem using Shor's algorithm may be 10.5 hours for the 256-bit key size, 37.67 hours for the 384-bit key size and 55 hours for the 521-bit key size. The quantum-resilient replacement strategy for the ECC discrete-log problem cryptosystem may be to move to the NIST selected PQC algorithm when it is available.

SHA256 may be in the category of bitcoin mining. SHA256 may not have a key size. The security parameter for SHA256 may be 72. The quantum algorithm that may defeat SHA256 may be Grover's algorithm. The number of logical qubits required to implement Grover's algorithm on SHA256 may be 2,403. The number of physical qubits required to implement Grover's algorithm on SHA256 may be $2.23\times10^6$. The time required to break the SHA256 algorithm using Grover's algorithm may be $1.8\times10^4$ years.

PBKDF2 with 10,000 iterations may be in the category of password hashing. PBKDF2 with 10,000 iterations may not have a key size. The security parameter for PBKDF2 with 10,000 iterations may be 66. The quantum algorithm expected to defeat PBKDF2 with 10,000 iterations may be Grover's algorithm. The number of logical qubits required to implement Grover's algorithm on PBKDF2 with 10,000 iterations may be 2,403. The number of physical qubits required to implement Grover's algorithm on PBKDF2 with 10,000 iterations may be $2.23\times10^6$. The time required to break the PBKDF2 with 10,000 iterations algorithm using Grover's algorithm may be $2.3\times10^7$ years. The quantum-resilient replacement strategy for the PBKDF2 with 10,000 iterations cryptosystem may be to move away from password-based authentication.

Figure 2:
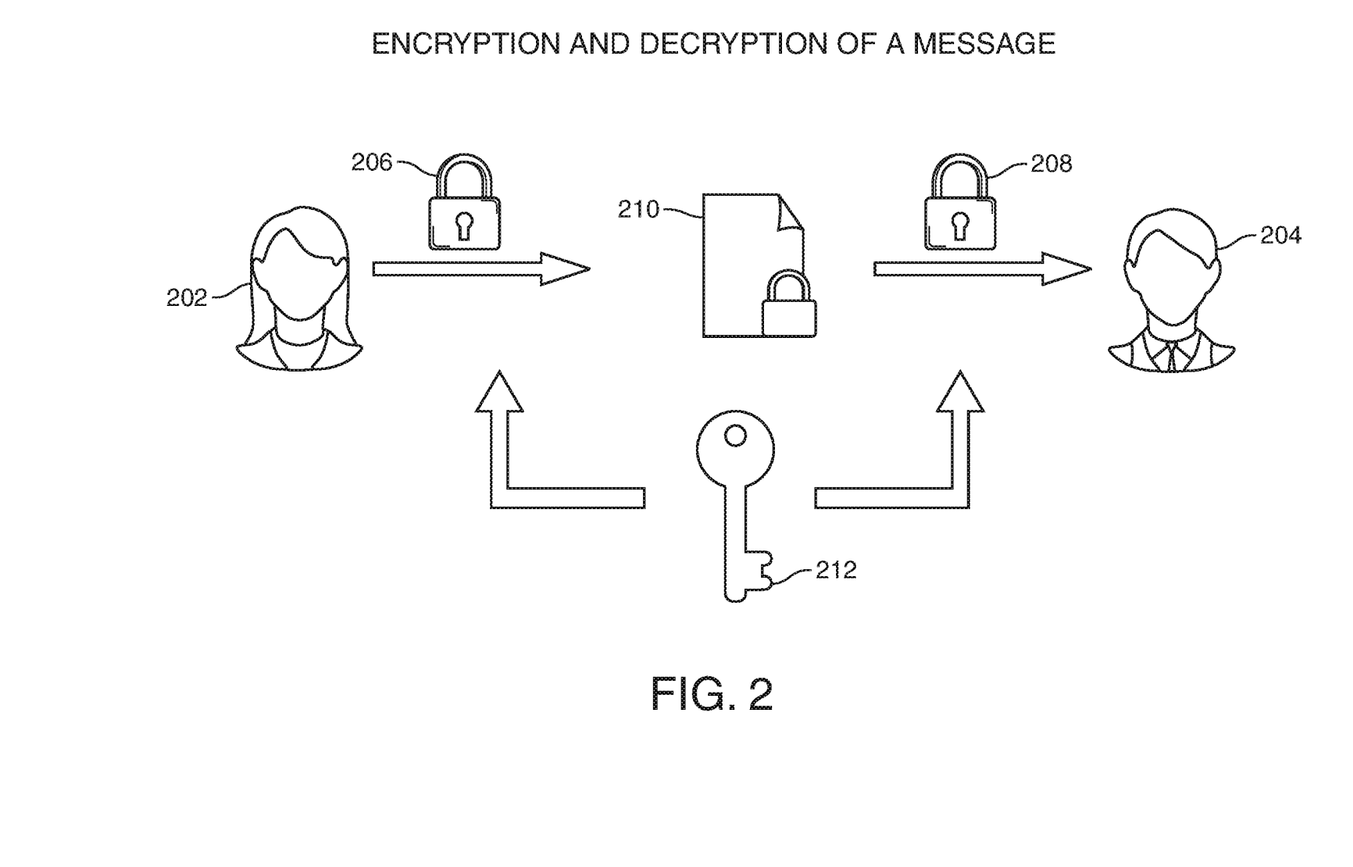
FIG. 2 shows an illustrative diagram in accordance with principles of the disclosure.

FIG. 2 shows an illustrative diagram showing the encryption and decryption of a message. Entity 202 may transmit message 210 to entity 204. In symmetric encryption, secret key 212 may be shared between entity 210 and entity 204. Message 210 may be encrypted with secret key 206 prior to being transmitted, as shown at 206. Encrypted message 210 may be transmitted to entity 204. Encrypted message 210 may be transmitted over a network, such as the public internet. Encrypted message 210 may not be vulnerable to attack, because an interceptor may require secret key 206 in order to decipher the encrypted message 210. Entity 204 may receive encrypted message 210. Entity 204 may decrypt encrypted message 210 with secret key 212, as shown at 208. Entity 204 may then be able to view decrypted message 210.

Figure 3:
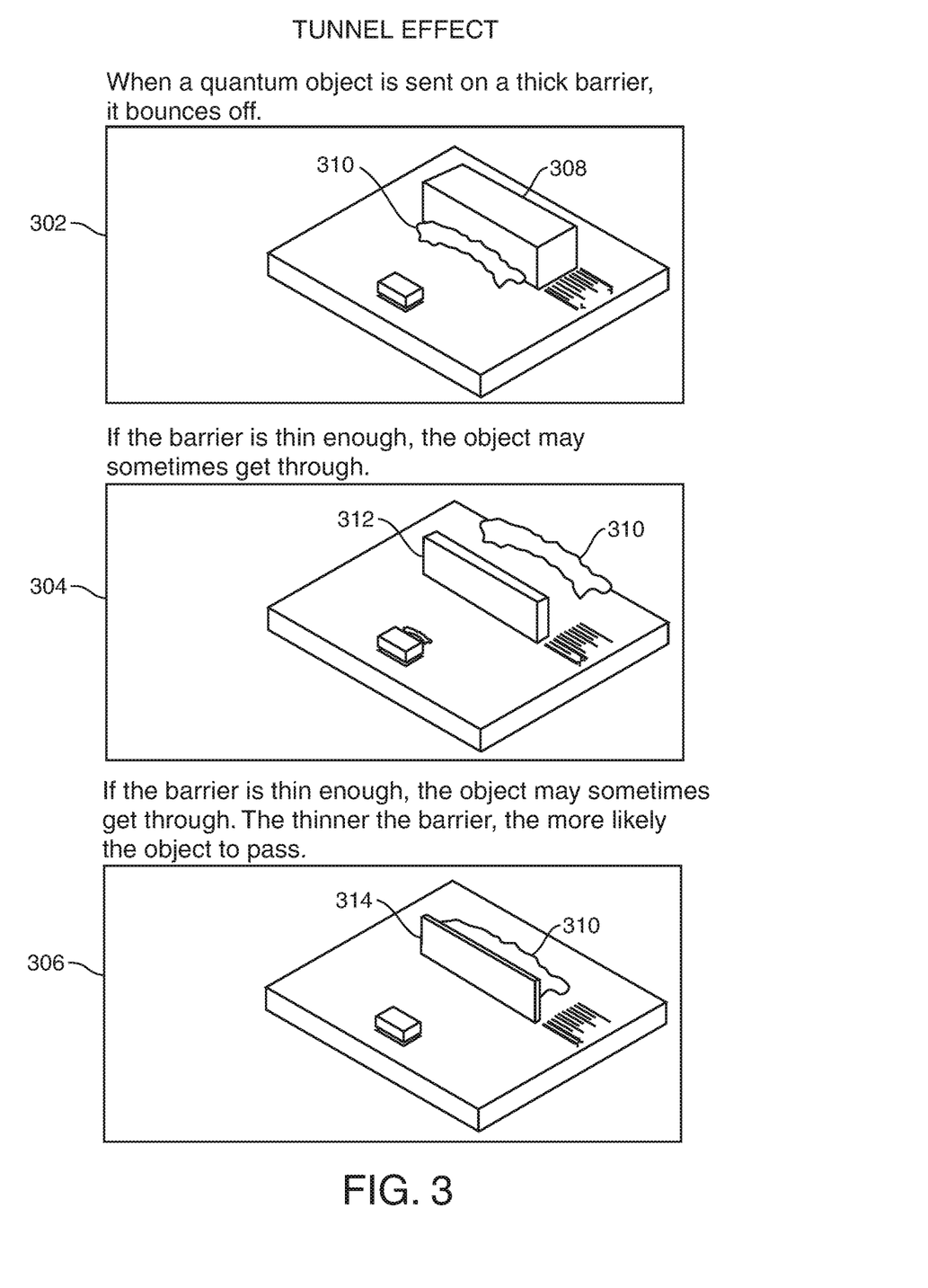
FIG. 3 shows another illustrative diagram in accordance with principles of the invention.

FIG. 3 shows an illustrative diagram that shows the quantum tunnel effect. Section 302 shows quantum wave 310 being sent on barrier 308. When a quantum object is sent on a thick barrier, such as barrier 308, it bounces off, as shown at section 302.

Section 304 shows quantum wave 310 being sent on barrier 312. When a quantum object is sent on a barrier that is thin enough, such as barrier 312, it may get through, as shown at section 304.

Section 306 shows quantum wave 310 being sent on barrier 314. When a quantum object is sent on a barrier that is thin enough, such as barrier 314, it may get through, as shown at section 306. The thinner the barrier the more likely the object is to pass through.

Figure 4:
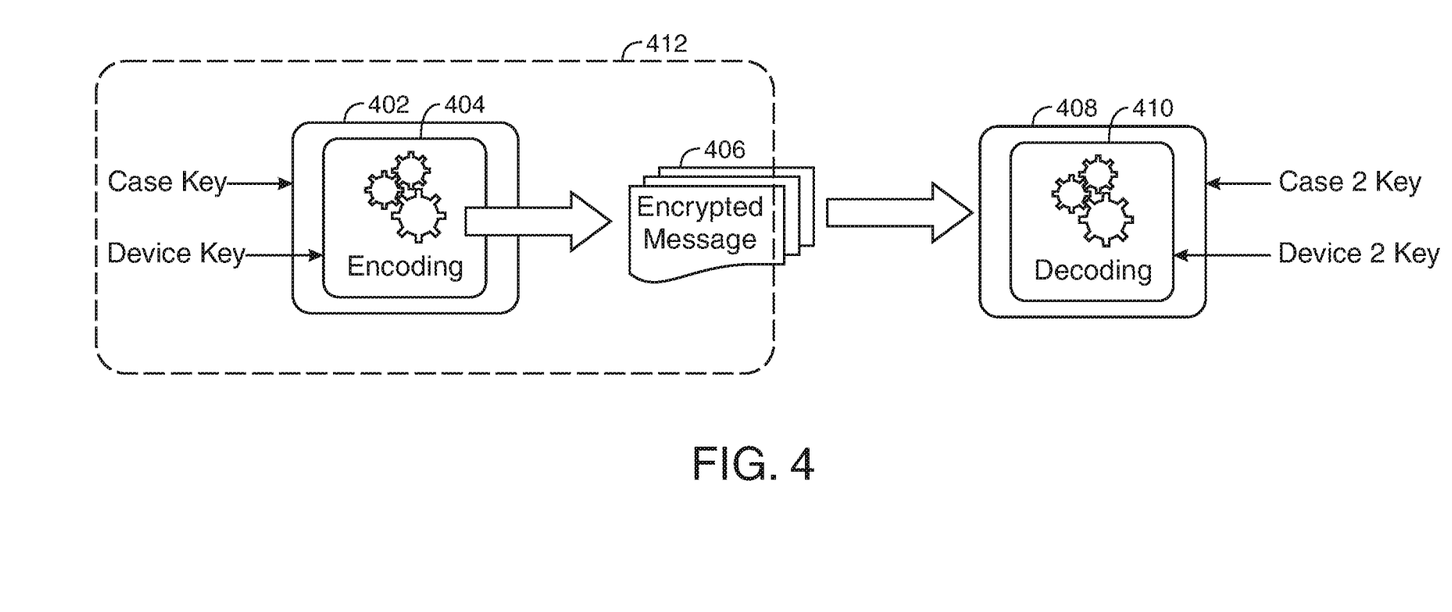
FIG. 4 shows yet another illustrative diagram in accordance with principles of the invention.

FIG. 4 shows an illustrative diagram. The illustrative diagram shows transmitting a quantum-resilient encrypted message from a first device to a second device. Device 404 may be encapsulated in case 402. Device 404 may be a silicon-based device. Case 402 may be a quantum-tunneling-enabled device case.

Case 402 may intercept all communications being transmitted from device 404. Device 404 and case 402 may have individual keys to enable the implementation of different cryptosystems. Case 402 may encrypt the intercepted communications with a case key. The case key may be a quantum-resilient encryption key. The case key may have been generated by a quantum random number generator included in case 402. The quantum random number generator may generate true random numbers and use the generated random numbers to encrypt the intercepted communications. The encrypted message, shown at 406, may be transmitted to another device, shown at 410. Device 410 may be encapsulated in quantum-tunneling-enabled device case 408. Device 410 and case 408 may have individual keys to enable the implementation of different cryptosystems.

As indicated by 412, encrypted message 406 may only be transmitted post encryption.

Figure 5:
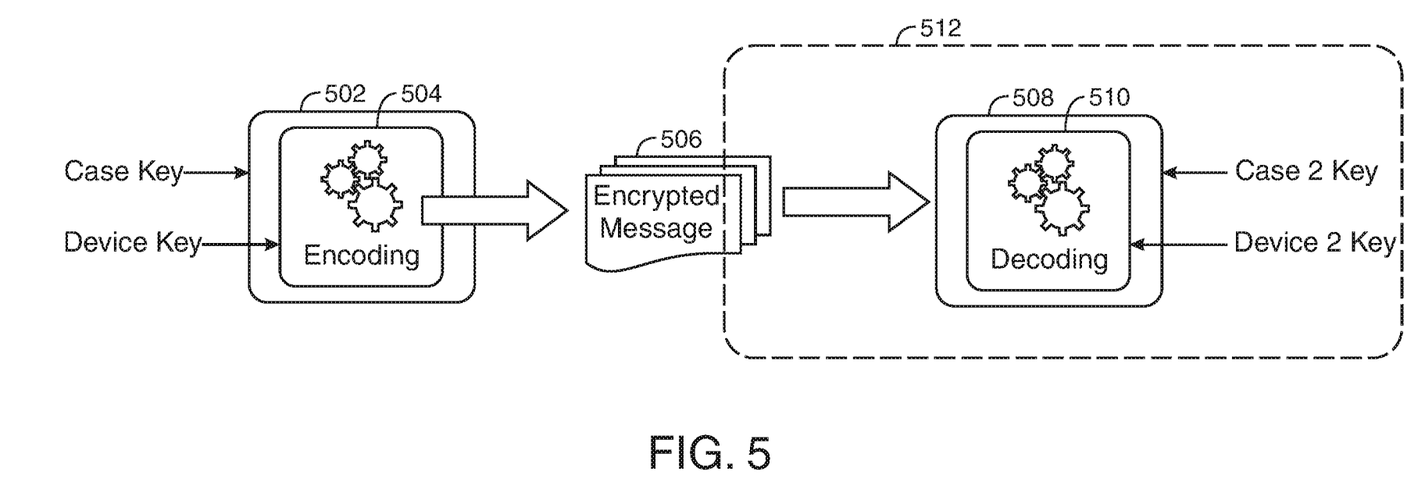
FIG. 5 shows still another illustrative diagram in accordance with principles of the invention.

FIG. 5 shows an illustrative diagram. The illustrative diagram shows receiving quantum-resilient encrypted message 506 at a second device. Message 506 may have been transmitted from a first device. Device 510 may be encapsulated in case 508. Device 510 may be a silicon-based device. Case 508 may be a quantum-tunneling-enabled device case. Device 510 and case 508 may have individual keys to enable the implementation of different cryptosystems.

Case 508 may intercept all messages or communications being transmitted to device 510. Case 508 may execute various actions on the intercepted message prior to transmitting, or pushing, the messages or communications to device 510. Some of the actions may include malware scanning, receiving the message via quantum-tunneling, decrypting a message that has been encrypted using a quantum random number generator or any other suitable action.

Device 504 and case 502 may have individual keys to enable the implementation of different cryptosystems. Encrypted message 506 may have been transmitted from device 504, via case 502. Encrypted message 506 may be received at case 508. Case 508 may decrypt the intercepted encrypted message 506 with case 2 key. Case 508 may then push the decrypted message to device 510. Case 508 may serv as a quantum-resilient firewall for device 510, as shown at 512. It should be appreciated that the communications between case 502 and case 508; device 504 and case 502; and device 510 and case 508 may be transmitted via quantum tunneling technology.

Figure 6:
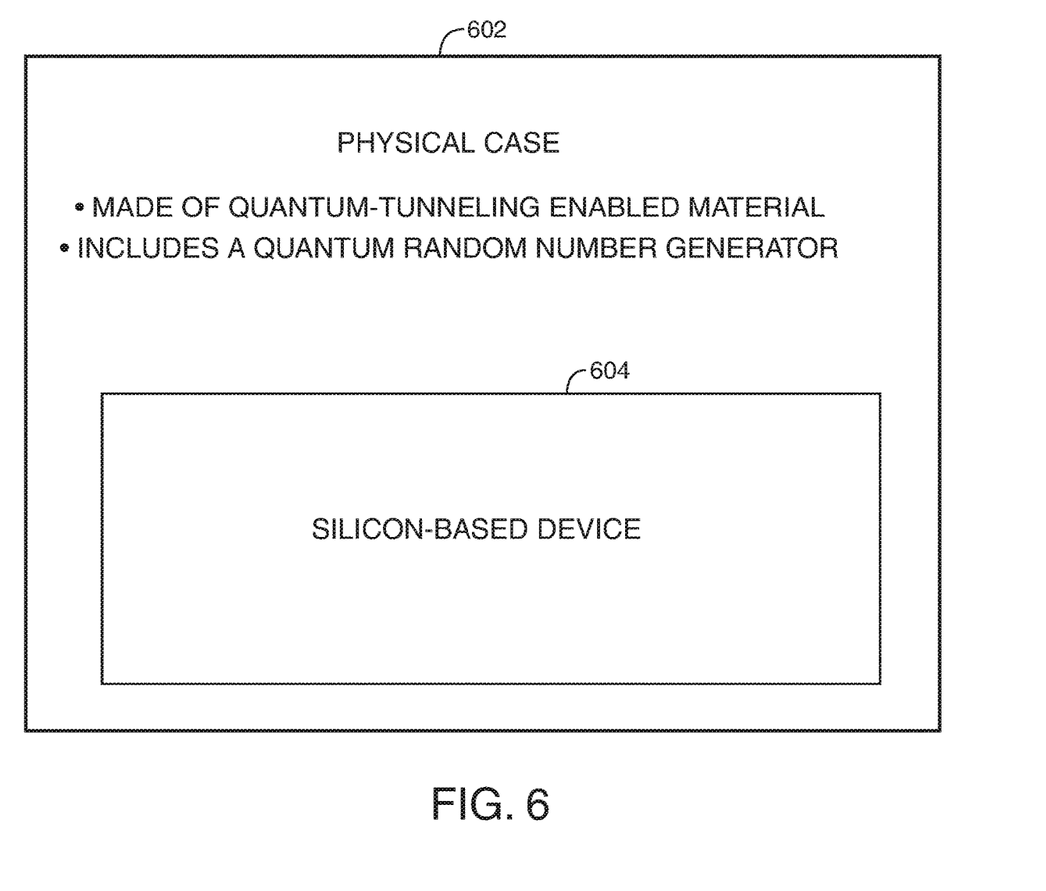
FIG. 6 shows yet another illustrative diagram in accordance with principles of the invention.

FIG. 6 shows an illustrative diagram. Physical case 602 may encapsulate silicon-based device 604. Physical case 602 may be openable and closable. Physical case 602 may be able to house one or more different silicon-based devices such as smartphones, smartwatches, personal computers, mainframes or any other suitable silicon-based device. Physical case 602 may also house a quantum-based device. Physical case 602 may be able to encapsulate any suitable device without prior configuration between the device and physical case 602. In some embodiments, prior to the encapsulation, physical device 602 may be paired to, or configured with, the device.

Physical case 602 may be made of quantum-tunneling enabled material. Therefore, physical case 602 may be able to communicate with device 604 using quantum-tunneling technology. Physical case 602 may also be able to communicate with other devices, cases or networks using quantum-tunneling technology.

Physical case 602 may also include a quantum random number generator. The quantum random number generator may generate strong random numbers using quantum technology. The generated random numbers may be used to encrypt communications being transmitted from device 604, via case 602.

Figure 7:
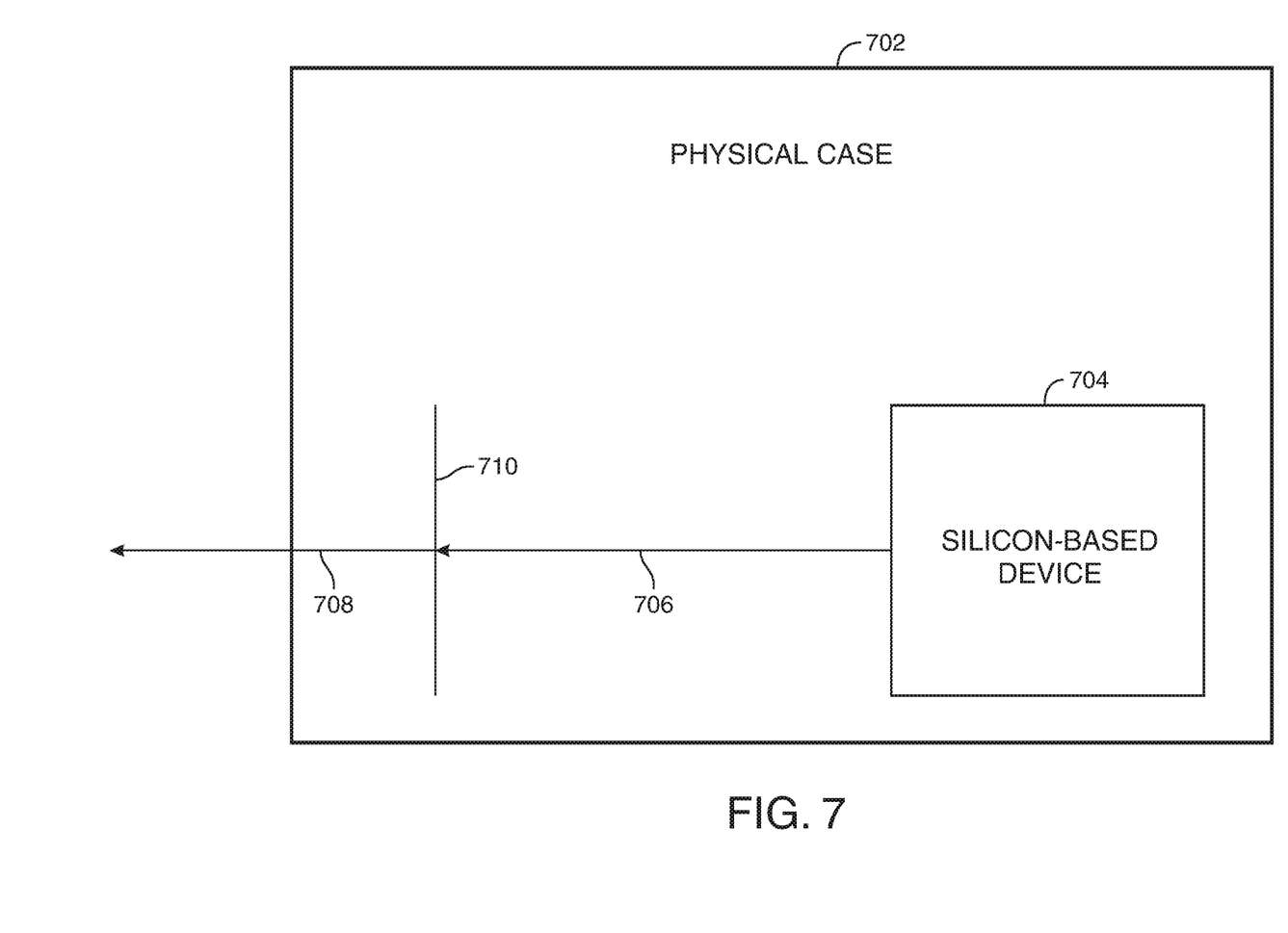
FIG. 7 shows still another illustrative diagram in accordance with principles of the invention.

FIG. 7 shows an illustrative diagram. Physical case 702 may encapsulate silicon-based device 704. A communication, shown at 706, may be transmitted from device 704. Physical case 702 may halt the communication, as shown at 710. Physical case 702 may encrypt the communication using a strong random number. Upon encryption, physical case 702 may transmit the communication to the intended recipient, as shown at 708. In some embodiments, the communication may be routed through various via points until it is transmitted to its intended recipient.

Figure 8:
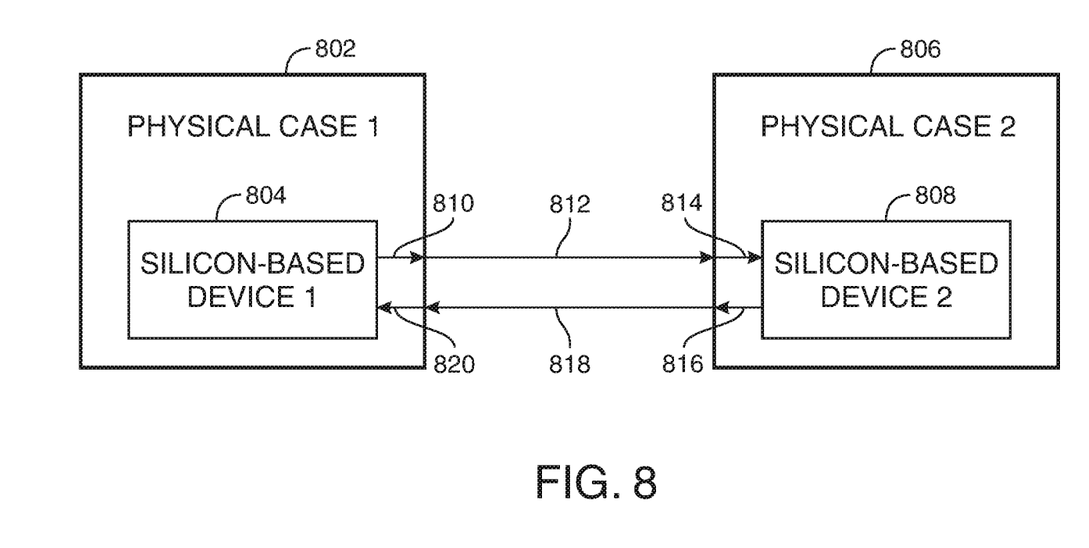
FIG. 8 shows yet another illustrative diagram in accordance with principles of the invention.

FIG. 8 shows an illustrative diagram. Communications may be transmitted between silicon-based device 1, shown at 804, encapsulated in physical case 1, shown at 802, and silicon-based device 2, shown at 808, encapsulated in physical case 2, shown at 806. In some embodiments, a communication transmitted from silicon-based device 1 to silicon-based device 2 may include three stages. A first stage, shown at 810, may be the transmission from device 1. A second stage, shows at 812, may be the transmission from case 1. A third stage, shown at 814, may be the transmission from case 2 to device 2.

A communication transmitted from device 2 to device 1 may also include three stages. A first stage, shown at 816, may be the transmission from device 2. A second stage, shown at 818, may be the transmission from case 2. A third stage, shown at 820, may be the transmission from case 1 to device 1.

It should be appreciated that both silicon-based device 1 and silicon-based device 2 may be not be aware that their communications are being intercepted, encrypted and/or decrypted. Therefore, it may not be necessary to reconfigure silicon-based device 1 or silicon-based device 2 to be compatible with a physical case.

Figure 9:
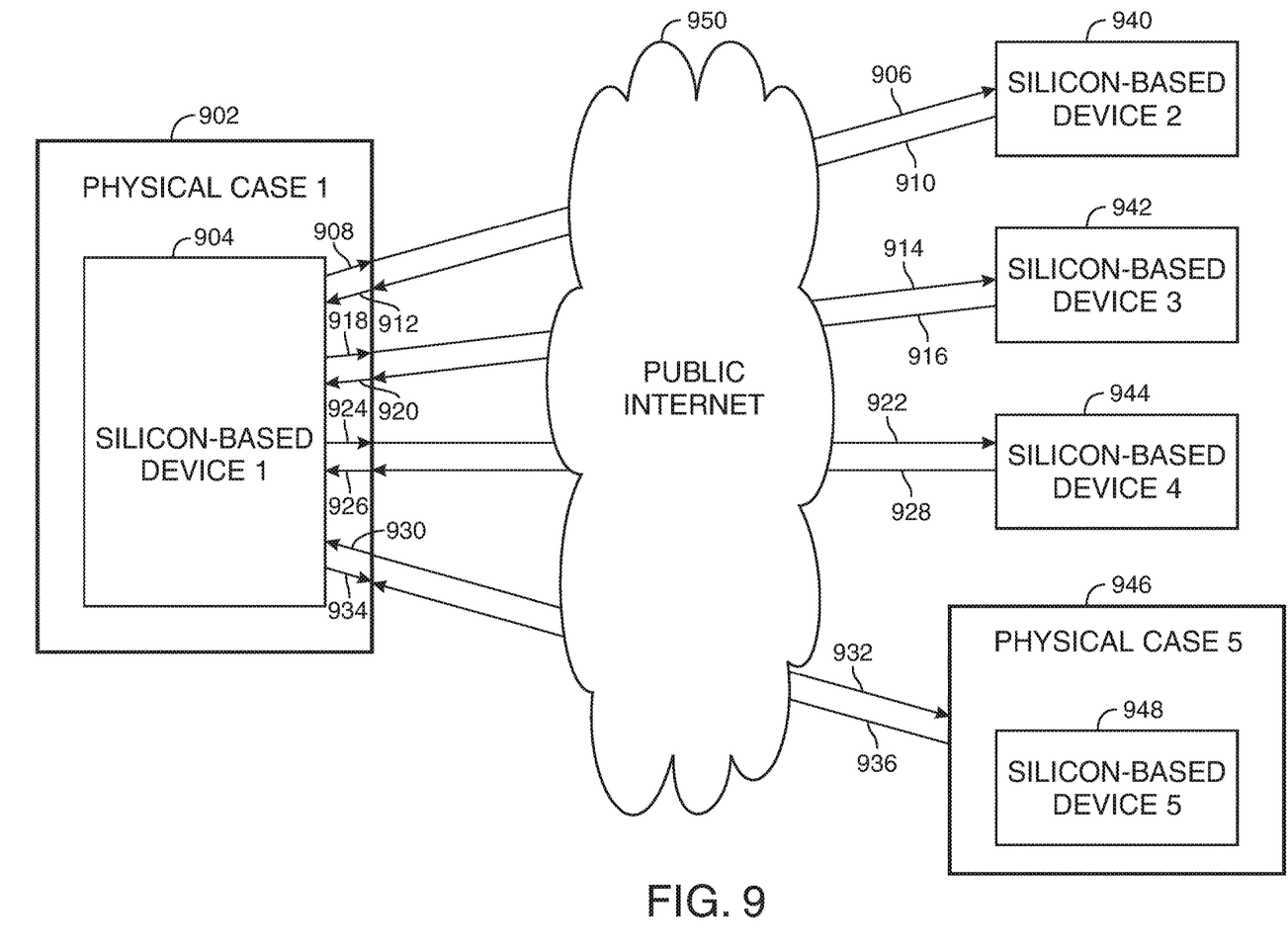
FIG. 9 shows still another illustrative diagram in accordance with principles of the invention.

FIG. 9 shows an illustrative diagram. Physical case 1, shown at 902, may encapsulate silicon-based device 1, shown at 904. Communications transmitted from device 1 via physical case 1 may be shown as two-step communications, shown at 908-906, 918-914, 922-924 and 932-930. Communications received at device 1 via physical case 1 may also be shown as two-step communications, shown at 910-912, 916-920, 928-926 and 936-934. The communications may include additional steps (not shown). The communications may be three-step communications as described above. It should be appreciated that these communications may be transmitted over the public internet, shown at 950. The communications may be transmitted and received from a variety of devices, such as device 2, shown at 940, device 3, shown at 942, device 4, shown at 944 and device 5, shown at 948. Device 5 may be encapsulated in case 5, shown 946. It should be appreciated that device 1 may communicate with devices that are encapsulated in cases as well as devices that are not encapsulated in cases.

Thus, systems and methods for a quantum-tunneling-enabled device case have been provided. Persons skilled in the art will appreciate that the present invention can be practiced by other than the described embodiments, which are presented for purposes of illustration rather than of limitation.

What is claimed is:

1. A method for quantum-resistant communication between a first silicon-based device and a second silicon-based device, the method comprising:
   encapsulating the first device in a first quantum-tunneling-enabled device case;
   encapsulating a second device in a second quantum-tunneling-enabled device case;
   transmitting a communication from the first device;
   receiving, via a first quantum-tunneling wave, the communication at the first quantum-tunneling-enabled device case;
   generating a quantum-resilient random number within the first quantum-tunneling-enabled device case;
   using the generated quantum-resilient random number to encrypt the communication;
   transmitting the encrypted communication over a network to the second device;
   receiving the encrypted communication at the second quantum-tunneling-enabled device case;
   decrypting the encrypted communication at the second quantum-tunneling-enabled device case; and
   transmitting, via a second quantum-tunneling wave, the communication from the second quantum-tunneling-enabled device case to the second device.

2. The method of claim 1, wherein:
   the first device is an automated teller machine ("ATM");
   the second device is a smartphone; and
   the encrypted communication between the ATM and the smartphone is an authentication communication.

3. The method of claim 1, wherein:
   the first device is a smartphone;
   the second device is an automated teller machine ("ATM"); and
   the encrypted communication between the ATM and the smartphone is an authentication communication.

4. A method for quantum-resistant communication between a first silicon-based device and a second silicon-based device, the method comprising:
   encapsulating the first device in a first quantum-tunneling-enabled device case;
   encapsulating a second device in a second quantum-tunneling-enabled device case;
   transmitting a communication from the first device;
   receiving the communication at the first quantum-tunneling-enabled device case;
   generating a quantum-resilient random number within the first quantum-tunneling-enabled device case;
   using the generated quantum-resilient random number to encrypt the communication;
   transmitting the encrypted communication, via a quantum-tunneling wave, to the second device;
   receiving the encrypted communication at the second quantum-tunneling-enabled device case;
   decrypting the encrypted communication at the second quantum-tunneling-enabled device case; and
   transmitting the communication from the second quantum-tunneling-enabled device case to the second device.

5. The method of claim 4, wherein:
   the first device is an automated teller machine ("ATM");
   the second device is a smartphone; and
   the encrypted communication between the ATM and the smartphone is an authentication communication.

6. The method of claim 4, wherein:
   the first device is a smartphone;
   the second device is an automated teller machine ("ATM"); and
   the encrypted communication between the ATM and the smartphone is an authentication communication.

7. The method of claim 4, wherein the decrypting the encrypted communication at the second quantum-tunneling-enabled device case includes scanning the communication for malware.

8. The method of claim 4, wherein the transmitting the encrypted communication to the second device is via a plurality of network locations.

9. The method of claim 4, wherein the first device is not paired with the case.

10. The method of claim 4, wherein the first device is paired with the case.

11. The method of claim 4, wherein the second device is unaware of the second case.

* * * * *